Oct. 23, 1951 E. A. ROCKWELL 2,572,520
MECHANISM FOR THE OPERATION OF VALVES
Original Filed Dec. 14, 1942 4 Sheets-Sheet 1
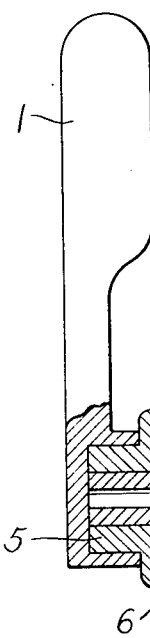
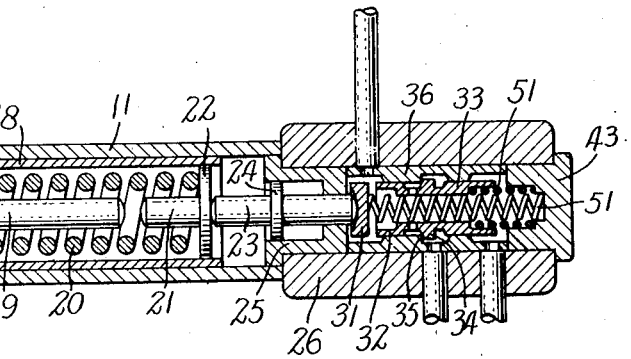
Fig. 1.
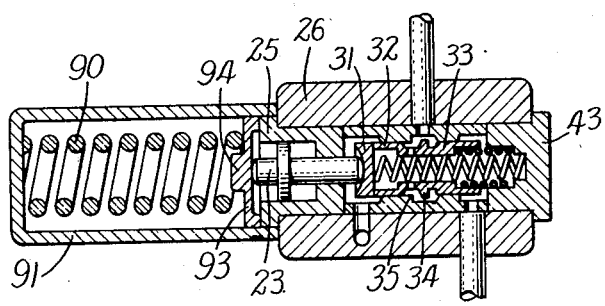
Fig. 11.
Inventor
Edward A. Rockwell
By Arthur Wright
Attorney Oct. 23, 1951  E. A. ROCKWELL  2,572,520
MECHANISM FOR THE OPERATION OF VALVES
Original Filed Dec. 14, 1942  4 Sheets-Sheet 2
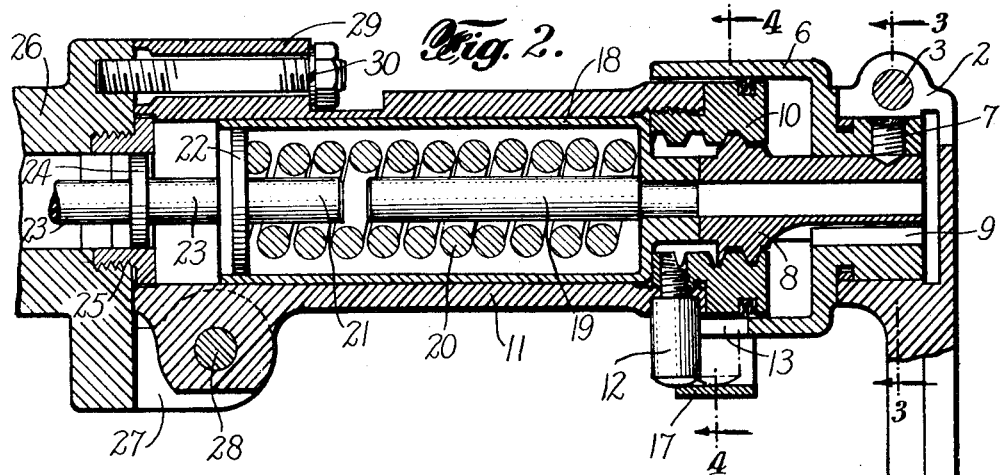
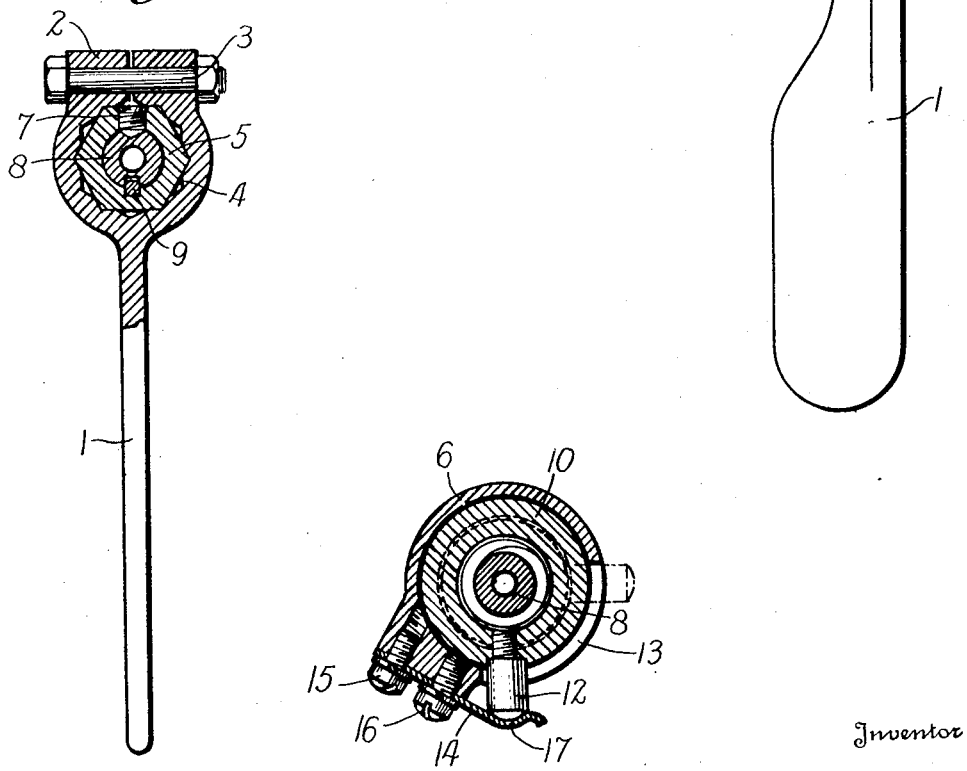
Inventor
Edward A. Rockwell
By Arthur Wright
Attorney

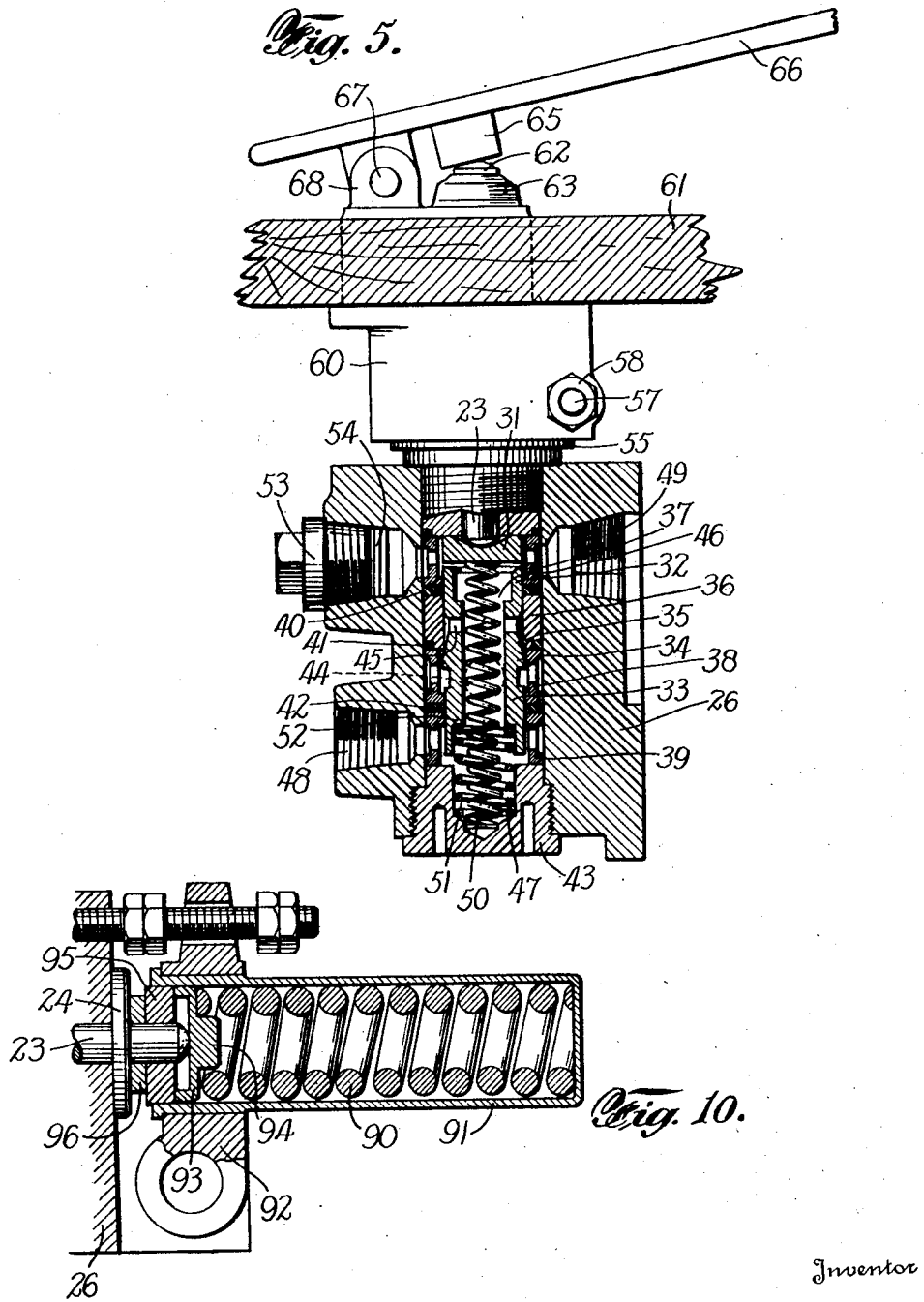

Oct. 23, 1951  E. A. ROCKWELL  2,572,520
MECHANISM FOR THE OPERATION OF VALVES
Original Filed Dec. 14, 1942  4 Sheets-Sheet 4

Inventor
Edward A. Rockwell
By Arthur Wright
Attorney

Patented Oct. 23, 1951

2,572,520

UNITED STATES PATENT OFFICE 2,572,520

MECHANISM FOR THE OPERATION OF VALVES

Edward A. Rockwell, Shaker Heights, Ohio, assignor to The New Britain Machine Company, New Britain, Conn., a corporation of Connecticut Application December 14, 1942, Serial No. 469,010, which is a division of application Serial No. 312,356, January 4, 1940, now Patent No. 2,331,800, dated October 12, 1943. Divided and this application April 27, 1946, Serial No. 665,534

10 Claims. (Cl. 303—54)

My invention relates particularly to mechanism for operating valves of various kinds.

This is a division of my copending application Ser. No. 469,010, filed December 14, 1942, now abandoned, upon Valve Operating Mechanism, which is itself a division of Patent No. 2,331,800, granted October 12, 1943, upon System for Controlling the Application of Power.

One of the objects of my inventon is to provide an effective mechanism for operating valves, and which is arranged so as to be especially desirable in the operation of fluid pressure systems for the operation of automobiles, airplanes, railroad cars, mine locomotives, etc., as well as other accessories. A further object is to provide a hydraulic or manually retractable plunger means for the operation of a valve mechanism such, for instance, as in the control of modulating valves for any desired purpose. Further objects of my invention will appear from the detailed description of the same hereinafter.

While my invention is capable of embodiment in many different forms for the purpose of illustration I have shown only certain forms thereof in the accompanying drawings, in which—

Fig. 1 is a diagrammatic representation of a hand-lever operated valve made in accordance with my invention;

Fig. 2 is a longitudinal section of a portion of the same enlarged;

Fig. 3 is a vertical section through the hand-lever thereof taken on line 3—3 of Fig. 2;

Fig. 4 is another vertical section through the hand-lever operating mechanism taken on line 4—4 of Fig. 2;

Fig. 5 is a vertical section of a pedal-operated valve in which the details of the valve used in Fig. 1 are shown;

Fig. 10 is a longitudinal section of a pressure-regulator valve adapted to operate with the same valve as shown in the preceding Figure 7; and Fig. 11 is a diagrammatic longitudinal section of the assembly of a valve operating mechanism similar to that shown in Fig. 10.

Figures 7, 9:
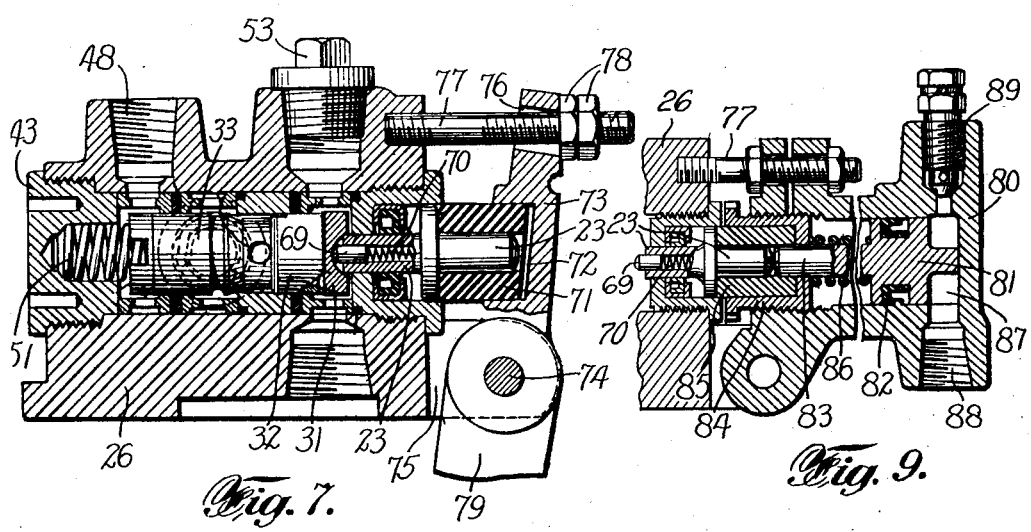
Fig. 7 is a longitudinal section of a modified form of valve mechanism operated by a hand lever.
Fig. 9 is a vertical section of a fluid-pressure operating means for the valves shown in the preceding Fig. 7 for example.

Referring first to the form of my invention shown in Figs. 1 to 4, I have provided a hand-operated lever 1 having a split end 2 and a clamping screw 3 adjacent to an angular recess 4 to receive a hexagonal end 5 of a rotary housing 6 through which there passes a screw 7 for holding the housing in position. Within the hexagonal end 5 there is a high pitch screw 8 held in place in the housing 6 by means of a key 9. The high pitch screw 8 cooperates with an internally screw-threaded ring 10 which is screw-threaded on the outside therein within a spring housing 11. The said spring housing 11 has a radial pin 12 screw-threaded into the ring 10 and the said housing 6 has a slot 13 to receive the pin 12. Adjacent to the slot 13 there is provided on the housing 6 a spring clip 14 held in place by screws 15 and 16 so that the valve may be held firmly in off position when the radial pin 12 is within a bent port 17 on said clip 14. By the rotation of the handle 1 the screw 8 can be moved inwardly so as to move a spring shell 18, against the end of which the screw 8 abuts. The spring housing 11 and the spring shell 18 are two cylindrical members which are separately removable from the valve casing or body portion 26, and they are telescoping inasmuch as the spring shell 18 extends within the spring housing 11. Furthermore, within the end of the spring shell 18 there is carried a guide rod 19 for a coil spring 20 within the shell 18, the other end of said spring 20 being located around a rod 21 located on a disk 22 which moves within the spring shell 18 and acts as a guide therein. The disk 22 abuts against a plunger rod 23 having a guiding flange 24 thereon which fits within a ring-shaped casing 25 screw-threaded into a valve casing 26. The valve casing 26 has ears 27 to receive a portion of the spring housing 11 and to which the latter is fastened by a pin 28 passing through the same. The other side of the spring housing 11 has an apertured projection 29 through which a screw 30 passes and is screw-threaded into the valve casing 26. The said plunger rod 23, after passing through the ring-shaped casing 25, is arranged to operate a cylindrical outlet valve seat member 31 which cooperates with an outlet valve member 32 on the end of a tubular valve member 33 having peripherally arranged thereon a conical inlet valve member 34 for cooperating with a valve seat 35 on a sleeve 36 carried within the valve casing 26. In the form of the invention shown in Figs. 5 and 6, apertured spacing members 37, 38 and 39 may be substituted, if desired, for the sleeve 36 and located around the tubular valve member 33 the same being provided with intervening rubber seals 40, 41 and 42 which may be compressed by adjustment of a screw-threaded ring 43 on which the spacing ring 39 rests and which is screw-threaded into the end of the valve casing 26. An inlet port 44 for high pressure liquid from any desired source, as for example a pump-operated accumulator not shown, is provided in the valve casing 26 and connected with the inlet valve 34, 35, so as to supply the liquid thereto through the apertured ring 38. When so received the high pressure liquid admitted by the valve 34, 35 passes through a series of lateral inlet ports or holes 45 in the side of the tubular valve member 33 so as to be received in a longitudinal passageway 46 in the tubular valve member 33 to be conducted from the lower end of the same into an end chamber 47 and thence to a delivery opening 48 in the valve casing 26 for the operation of any desired accessory, as for example the brakes of an automotive vehicle. The released liquid is discharged from the valve mechanism when the valve 31, 32 is open, by a discharge port 49 in the valve casing 26. The outlet valve member 31 is normally maintained open by a coil spring 50 supported by the screw plug 43, and the valve 34, 35 is normally kept closed by a coil spring 51 also supported by the screw plug 43 and the upper end of which rests against an internal shoulder 52 in the tubular valve member 33. A screw plug 53 normally closes an opening 54 which may be used as a discharge opening when desired.

Figures 6, 8:
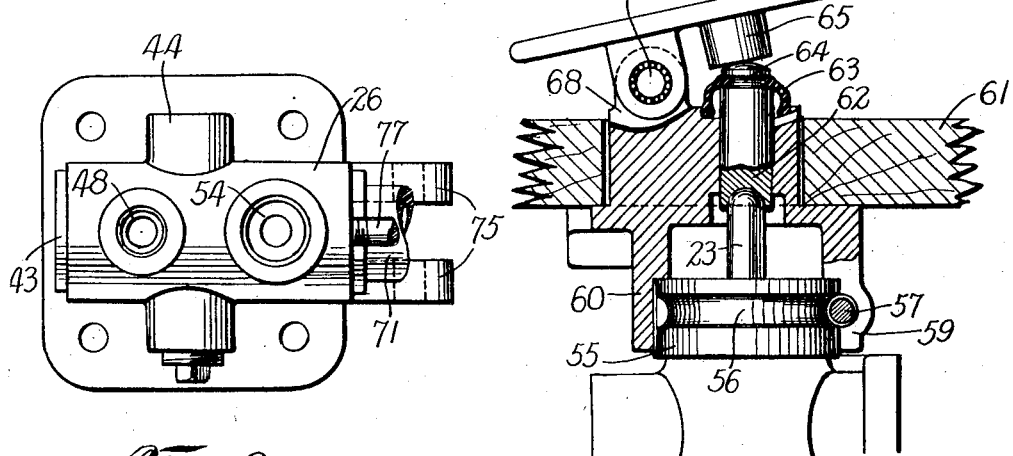
Fig. 6 is a vertical section of the valve operating mechanism of Fig. 5.
Fig. 8 is a plan view of the same.

The upper end of the valve casing 26 has an extension 55 provided with an annular recess 56 to receive a screw-threaded pin 57 having a nut thereon. The pin 57 crosses through a split end 59 on a pedal bracket 60, which is shown in Fig. 6 as extending upwardly through a floorboard 61 of an automotive vehicle. The rod 23 is adapted to be moved downwardly by means of an end plunger 62 passing through the pedal bracket 60 and which has a rubber boot 63 carried in an annular recess 64 on the end plunger 62. The upper end of the end plunger 62 is located adjacent to a boss 65 beneath a pedal 66 carried on a pivot pin 67 passing through ears 68 on the pedal bracket 61.

The form of my invention shown in Figs. 7 and 8 is constructed the same as that shown in Fig. 5 so far as the valve structure is concerned, except in the following respects: In this instance the internal spring 50 is omitted and the outlet valve member 31 is normally kept in closed position to prevent the accumulation of air to the left of the same by means of a spring-pressed subsidiary plunger 69 within the rod 23 pressed towards the outlet valve member 31 by a light spring 70. Also in this instance, around the outer end of the rod 23 there is an annular rubber spring cushion 71, similar in effect to the coil spring 20, in Fig. 1, which is carried in a shell-like recess 72 in an arm 73 carried on a pivot pin 74 passing through ears 75 on the valve casing 26. The arm 73 has a hole 76 through which passes a screw 77 screw-threaded into the valve casing 26 and having adjusting nuts 78 thereon. Integral with the arm 73 there is an operating handle 79.

Instead of operating the valves previously described by means of a pedal or a hand lever any of said valves may be operated by fluid pressure, for example as shown in Fig. 9 when applied to the valve structure in Fig. 7. For this purpose I may provide a plunger casing 80 adapted to be secured by the pivot pin 74 and screw 77 in the same manner as previously described, to the valve casing 26, said casing having within the same a plunger 81 provided with a U-shaped rubber seal 82 and having a stem 83 passing through a screw-threaded ring 84 screw-threaded into the plunger casing 80 and having a bushing 85 therein taking the place of the rubber spring cushion 71 to receive the outer end of the rod 23 and so as to receive, also, the stem 83, around which there is provided a coil spring 86. At the outside of the plunger 81 there is a chamber 87 for receiving manually controlled pressure liquid from an inlet port 88 in the plunger casing 80. There is also provided opposite the port 88 an air bleeder screw 89 which can be unscrewed to permit the escape of air.

Furthermore, I have shown in Figs. 10 and 11 other forms of my invention, comprising a pressure regulator valve which is designed to permit the passage of liquid only up to a given pressure. For this purpose I utilize the same tubular valve construction as shown and described in connection with Figs. 1 and 7 for Figs. 11 and 10 respectively, in which, however, the inlet valve 34, 35 is normally maintained open by means of a compressed coil spring 90 which is carried in a spring shell 91 supported within a spring bracket 92 connected to the valve casing 26 in the same manner. The coil spring 90 is supported at one end of the shell 91 and at the other end by a disk plunger 93 having a guiding boss 94 thereon. The disk plunger 93 rests against the end of the rod 23 and the latter is positioned within the shell 91 by a ring 95 having a washer 96 between the same and the flange 24.

In the operation of my invention, referring first to the operation of the handle 1 in Figs. 1 to 4 but in which the valve operation is substantially the same as in Figs. 5 and 6, including the treadle 66, the high pressure fluid may be admitted by the port 44 by unseating the inlet modulating valve 34, 35 by rotation of the handle 1 which compresses the spring 20 and after seating the valve 31, 32 opens the said inlet valve 34, 35. Thereupon, in an intermediate position for example, the admitted pressure liquid from the port 44 passes through ports 45 into the internal passageway 46 of the tubular valve member 33 and is thence delivered as a modulated pressure liquid to the chamber 47 and the outlet port 48 to be supplied to any accessory for moving the same. The modulated pressure liquid thus supplied to the port 48 in accurately controllable amounts or small increments may be released to any desired extent by the release of at least some of the manual pressure on the pedal 66, thus opening the outlet valve 31, 32 which liquid, accordingly, is then discharged through the release port 49. When the valve mechanism is to be retained in inoperative position this may be done by rotating the handle 1 back to the starting position where it is retained in this position by the pin 12 being moved into the bent portion 17 of the clip 14.

Instead of operating the mechanism by the handle 1, the valve mechanism can be operated by the pedal 66, as shown in Figs. 5 and 6. In this instance the valve operation is the same as previously described in connection with Fig. 1 except that in Figs. 5 and 6 the plunger 62 is moved downwardly in the same direction as the movement of the foot pedal 66 and so that when the pressure liquid is being applied for the movement of the accessory the reaction therefrom on the foot, by the hydraulic pressure that has been applied, reacting upwardly through the plunger valve 33, valve seat 31, plungers 23 and 62 and pedal lever 66, varies coordinately to the pressure in the liquid supplied to the accessory. In this way the operator of the pedal 66 can at all times sense the degree of pressure or power being applied to the accessory.

In the operation of the form of my invention shown in Figs. 7 and 8 the valve mechanism is operated by the hand lever 79 which "feels" a reaction or resistance to its movement coordinate in extent to the hydraulic pressure liquid being applied to the accessory as above referred to. Also, in this instance, instead of the outlet valve 31, 32 being normally open this valve is kept normally lightly closed by means of the spring 70 and plunger 69 to prevent the accumulation of air adjacent to the left face of the same. This will not interfere with the release of the liquid through the outlet port 49 inasmuch as any pressure within the tubular valve 33 or within the line leading from the delivery port 48 will force the outlet valve member 31 off its seat when the pressure on the hand lever 79 is released.

In the operation of the form of my invention as shown in Fig. 9, it will be understood that the same kind of valve mechanisms shown in Fig. 7, for example, of the preceding figures may be operated by pressure fluid or hydraulically, instead of by means of the hand levers or foot pedal. This is accomplished by supplying the pressure fluid or liquid to the inlet port 48 to the degree desired, which coordinately moves the inlet plunger 81, thereby operating the outlet valve 31, 32 and the inlet valve 34, 35 for the delivery of pressure liquid to the accessory in the manner previously described.

The operation of the regulator valve shown in Figs. 10 and 11 is such that the coil spring 90 normally maintains the outlet valve 31, 32 in closed position and the inlet valve 34, 35 in open position. Thus, the pressure liquid supplied to the inlet port 44 normally passes through the valve and out through the delivery port 48 until the pressure in said liquid reaches a given amount, as, for example, 1000 lbs. per square inch, whereupon the spring 90 becomes further compressed by the maximum pressure in the pressure liquid so as to open the outlet valve 31, 32 and close the inlet valve 34, 35, thus releasing liquid through the port 49 until the pressure falls sufficiently to close the outlet valve 31, 32 and open the inlet valve 34, 35. The pressure supplied through the regulator valve will thus be maintained at substantially a given pressure.

While I have described my invention above in detail I wish it to be understood that many changes may be made therein without departing from the spirit of the same.

I claim:

1. A valve mechanism having a tubular valve member, provided with openings at both ends, carrying inlet and outlet valve elements and having also a lateral inlet port in the tubular valve member between the inlet and outlet valve elements, a valve casing for the same having an inlet opening on the other side of the inlet valve element from the lateral inlet port, a plunger having an outlet valve seat element associated therewith and having means associated with the valve seat element to normally maintain the outlet valve seat in open position, a casing for the plunger removably secured to the valve casing and means for applying a pressure to the plunger to open the inlet valve member after the outlet valve seat is in closed position.

2. A valve mechanism having a plunger valve member with a longitudinal passageway provided with openings at both ends and also a lateral port through the plunger, carrying inlet and outlet valve elements, on opposite sides of said port, communicating with said passageway, a valve casing for the same having an inlet for pressure fluid on the other side of the inlet valve element from the lateral inlet port, and an outlet delivery port for the pressure fluid said inlet and outlet being adapted to be connected, respectively, to said passageway, a second plunger having an outlet valve seat element associated therewith cooperating with said outlet valve element, a casing for the second plunger removably secured to the valve casing and means for applying a pressure to the second plunger to open the inlet valve element after the outlet valve seat is in closed position.

3. A valve mechanism having a plunger valve member with a longitudinal passageway provided with openings at both ends and also a lateral port through the plunger, carrying inlet and outlet valve elements, on opposite sides of said port, for controlling communication with said passageway, a valve casing for the same having an inlet for pressure fluid, on the other side of the inlet valve element from the lateral inlet port, and an outlet delivery port for the pressure fluid said inlet and outlet being adapted to be connected, respectively, to said passageway, a second plunger having an outlet valve seat element associated therewith, cooperating with said outlet valve element, a casing for the second plunger removably secured to the valve casing and means, pivotally mounted on the valve casing, for moving the second plunger to open the inlet valve element after the outlet valve seat element is in closed position.

4. A valve mechanism having a tubular valve member provided with a longitudinal passageway open at both ends, carrying inlet and outlet valve elements for controlling communication with said passageway, a valve casing for the same, a plunger having an outlet valve seat element associated therewith, a casing for the plunger removably secured to the valve casing and means, including a spring within a spring shell, for normally moving the plunger to open the inlet valve element after the outlet valve seat element is in closed position, said spring being adapted to be compressed by the increase of liquid pressure to close the inlet valve element and open the outlet valve seat element.

5. A modulator valve comprising a spring-pressed tubular movable valve member provided with a peripheral inlet valve having a lateral port, a movable outlet valve seat element, a valve casing therefor having a high pressure liquid inlet and an outlet for modulated pressure liquid, a discharge port for low pressure liquid, a valve seat within said casing for said peripheral valve, hydraulically operated means for applying a pressure to the tubular movable valve member to unseat said peripheral valve so as to admit the liquid from the peripheral valve to the interior of the tubular valve through the lateral port and maintain closed the outlet valve seat element at one end of the tubular valve in order to convey the liquid from the tubular valve to the modulated pressure outlet, and means at other times urging the closure of said first mentioned end of said valve by the outlet valve seat element but permit the unseating thereof for the escape of liquid.

6. A modulator valve comprising a spring-pressed tubular movable valve member provided with a peripheral inlet valve having a lateral port, a movable outlet valve seat element, a valve casing therefor having a high pressure liquid inlet and an outlet for modulated pressure liquid, a discharge port for low pressure liquid, a valve seat within said casing for said peripheral valve, hydraulically operated means to unseat said peripheral valve so as to admit the liquid from the peripheral valve to the interior of the tubular valve through the lateral port and maintain closed the outlet valve seat element at one end of the tubular valve in order to convey the liquid from the other end of the tubular valve to the modulated pressure outlet, and a light spring at other times urging the closure of said first mentioned end of said valve by the outlet valve seat element but permitting the unseating thereof for the escape of liquid.

7. A modulator valve comprising a spring-pressed tubular movable valve member provided with a peripheral inlet valve having a lateral port and a movable outlet valve seat closure, a valve casing therefor having a high pressure liquid inlet and an outlet for modulated pressure liquid, a discharge port for low pressure liquid, a valve seat within said casing for said peripheral valve, and a spring-retracted hydraulic means, including a plunger and a hydraulic connection leading thereto, adapted to unseat said peripheral valve so as to admit the liquid therefrom to the interior of the tubular valve through the lateral port and maintain closed the outlet valve seat closure at one end of the tubular valve in order to convey the liquid from the other end of the tubular valve to the modulated pressure outlet.

8. A modulator valve comprising a spring-pressed tubular movable valve member provided with a peripheral inlet valve having a lateral port and a movable outlet valve seat end closure, a valve casing therefor having a high pressure liquid inlet and an outlet for modulated pressure liquid, a discharge port for low pressure liquid, a valve seat within said casing for said peripheral valve, and a spring-retracted means, comprising a plunger, a hydraulic connection leading thereto, and a spring housing detachable from said casing, having a spring therein to unseat said peripheral valve so as to admit the liquid therefrom to the interior of the tubular valve through the lateral port and close the outlet valve seat closure at one end of the tubular valve in order to convey the liquid from the other end of the tubular valve to the modulated pressure outlet.

9. A valve mechanism, including means for operating the same, comprising an integral body portion having therein three ports for the inlet, exhaust and delivery of a pressure fluid, respectively, as well as two telescoping members separately removable from said body portion, a tubular valve member having inlet and exhaust valve elements on said tubular valve member, a spring enclosed in the inner one of said telescoping members for the operation of the valve mechanism, adapted to coact with the tubular valve member within said body portion for the control of said ports, the inner one of said telescoping members having therein a reciprocable spring guide acting as a valve operating member, and a valve operating rod associated with said valve operating member and extending into said body portion to operate the tubular valve member.

10. A valve mechanism, including means for operating the same, comprising an integral body portion having therein three ports for the inlet, exhaust and delivery of a pressure fluid, respectively, as well as two telescoping members separately removable from said body portion, a tubular valve member having inlet and exhaust valve elements on said tubular valve member, a spring enclosed in the inner one of said telescoping members for the operation of the valve mechanism, adapted to coact with the tubular valve member within said body portion for the control of said ports, said two telescoping members comprising an inner cylindrical means associated therewith for manual operation of the valve, the inner one of said telescoping members having therein a reciprocable spring guide acting as a valve operating member, and a valve operating rod associated with said valve operating member and extending into said body portion to operate the tubular valve member.

EDWARD A. ROCKWELL.

REFERENCES CITED

The following references are of record in the file of this patent:

UNITED STATES PATENTS

| Number | Name | Date |
|---|---|---|
| 222,803 | Westinghouse | Dec. 23, 1879 |
| 251,980 | Westinghouse | Jan. 3, 1882 |
| 721,499 | Brennan | Feb. 24, 1903 |
| 1,526,452 | Alden | Feb. 17, 1925 |
| 1,566,111 | Miller | Dec. 15, 1925 |
| 1,791,901 | McIntyre | Feb. 10, 1931 |
| 1,815,628 | McIntyre | July 21, 1931 |
| 1,927,700 | Dickinson | Sept. 19, 1933 |
| 2,132,090 | Vorech | Oct. 4, 1938 |
| 2,215,172 | Christensen | Sept. 17, 1940 |
| 2,215,602 | Baade | Sept. 24, 1940 |
| 2,232,974 | Roy | Feb. 25, 1941 |